United States Patent [19]

Sasaki et al.

[11] Patent Number: 5,208,901
[45] Date of Patent: May 4, 1993

[54] GRAPHIC IMAGE DRAWING DEVICE

[75] Inventors: Hiroyuki Sasaki, Gamagori; Ichiro Sasaki, Chita; Yosuke Ito, Takamatsu, all of Japan

[73] Assignee: Brother Kogyo Kabushiki Kaisha, Nagoya, Japan

[21] Appl. No.: 903,273

[22] Filed: Jun. 24, 1992

[30] Foreign Application Priority Data

Jun. 24, 1991 [JP] Japan ................... 3-151844

[51] Int. Cl.⁵ ............................ G06K 15/00
[52] U.S. Cl. .................. 395/117; 395/101
[58] Field of Search ........... 395/101, 103, 109, 117, 395/110, 140, 141, 143, 147; 382/9, 22, 54, 55; 340/740, 747; 400/65

[56] References Cited

U.S. PATENT DOCUMENTS

| 4,675,830 | 6/1987 | Hawkins | 395/110 |
| 4,907,282 | 3/1990 | Daly et al. | 395/110 |
| 5,134,667 | 7/1992 | Suzuki | 382/22 |

Primary Examiner—Arthur G. Evans
Attorney, Agent, or Firm—Oliff & Berridge

[57] ABSTRACT

Two thick line segments intersecting at respective ends thereof are drawn with smooth lines at a portion where the ends of the two line segments merge. To this end, the two lines segments are extended in directions to overlap one on the other and an overlapped graphic segment is extracted for use in complementing the intersecting portion.

8 Claims, 6 Drawing Sheets

GRAPHIC IMAGE DRAWING DEVICE

BACKGROUND OF THE INVENTION

1. Field of the Invention

The present invention relates to a graphic image drawing device, and more particularly to a graphic image drawing device capable of drawing two thick line segments intersecting at respective ends thereof with smooth lines at the intersecting portion.

2. Description of the Prior Art

Conventionally, a cathode ray tube (CRT), a laser beam printer or the like have been used as a graphic image drawing device. The device receives graphic data from a host computer and a graphic image is drawn upon converting the graphic data to bit map data or runlength data.

Given a width w of a line and the coordinates of two points a and b defining a length of the line as shown in FIG. 1, the coordinates of four points a0, a1, a2 and a3 defining a thick line segment can be computed. Based on the data thus computed, bit map data or runlength data representative of the thick line segment are obtained for a graphical processing.

However, when two intersecting lines are to be depicted, a problem arises in how the intersecting portion of the two line segments are to be depicted. Specifically, when two thick line segments A and B are drawn to intersect at respective ends thereof as shown in FIG. 2, the portion around the merging point C of the two line segments A and B is seen to be somewhat incomplete. Such portion is notable as the line becomes thicker.

SUMMARY OF THE INVENTION

The present invention has been made to solve the above problem, and accordingly it is an object of the present invention to provide a graphic image drawing device capable of drawing intersecting thick lines which are smooth and continuous at the intersecting portion.

Another object of the present invention is to provide a graphic image drawing device capable of drawing a high quality graphic image.

To achieve the above and other object of the present invention, there is provided a graphic image drawing device as shown in FIG. 3 which includes first computing means (10) for obtaining graphic data representative of a line segment defined by a length between two given points and a width. First storage means (11) is provided for storing first graphic data representative of a first line segment and second graphic data representative of a second line segment. Both the first and second graphic data are obtained by the first computing means (10), wherein the first line segment has first and second side lines equal in length to a length of the first line segment while the second line segment also has first and second side lines equal in length to a length of the second line segment. The first and second line segments intersect at respective ends thereof and it is intended to draw the intersecting two lines with smooth outer profile lines in the portion where the two line segments merge.

There is provided second computing means (12) for obtaining first graphic data representative of a first extended graphic segment formed by extending the first and second side lines of the first line segment in a direction to intersect extended first and second side lines of the second line segment. The second computing means (12) further obtains second graphic data representative of a second extended graphic segment formed by extending the first and second side lines of the second line segment in a direction to intersect the extended first and second side lines of the first line segment. The first and second graphic data are computed by the second computing means (12) based on the first and second graphic data stored in the first storage means (10).

The drawing device further includes second storage means (13) for storing the first and second graphic data obtained by the second computing means (12), and extracting means (14) for extracting graphic data representative of an overlapped graphic segment of the first and second extended graphic segments based on the first and second graphic data stored in the second storage means (12). There is provided drawing means (15) for drawing a graphic image based on the first and second graphic data stored in the first storage means and the graphic data extracted by the extracting means.

BRIEF DESCRIPTION OF THE DRAWINGS

The particular features and advantages of the invention as well as other objects will become apparent from the following description taken in connection with the accompanying drawings, in which.

DETAILED DESCRIPTION OF THE PREFERRED EMBODIMENTS

A preferred embodiment of the present invention will be described with reference to the accompanying drawings. In the following embodiment, a laser beam printer is used as a graphic image drawing device.

Figure 1:
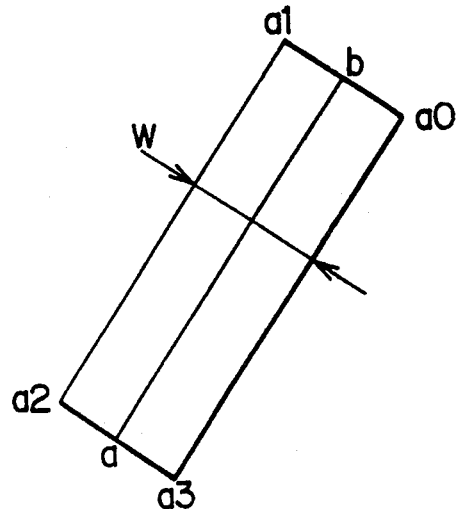
FIG. 1 is an explanatory diagram illustrating a conventional processing for drawing a thick line segment.
Figure 2:
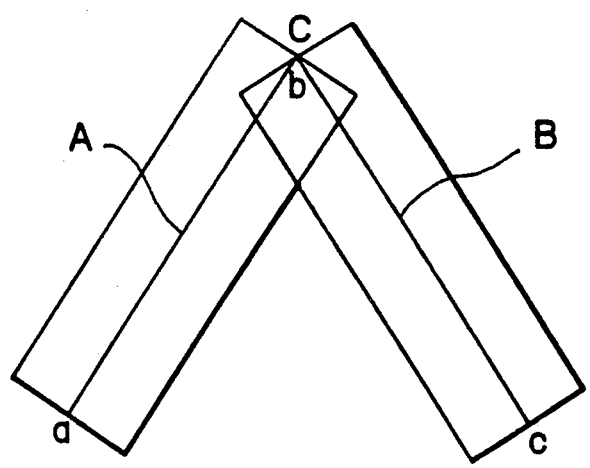
FIG. 2 is an explanatory diagram illustrating a conventional processing for drawing two thick line segments which intersect at ends of both lines.
Figure 3:
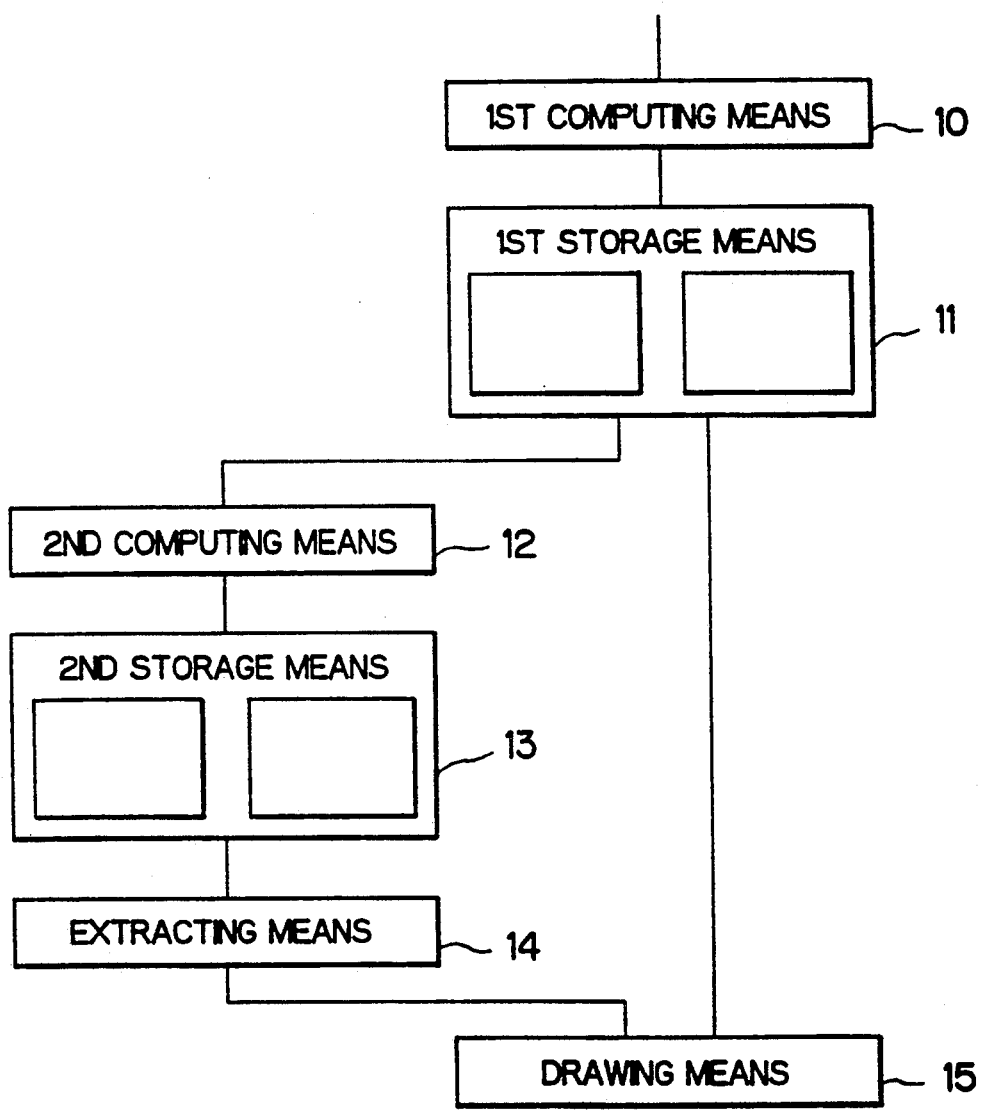
FIG. 3 is a block diagram showing a graphic image drawing device according to the present invention.
Figure 4:
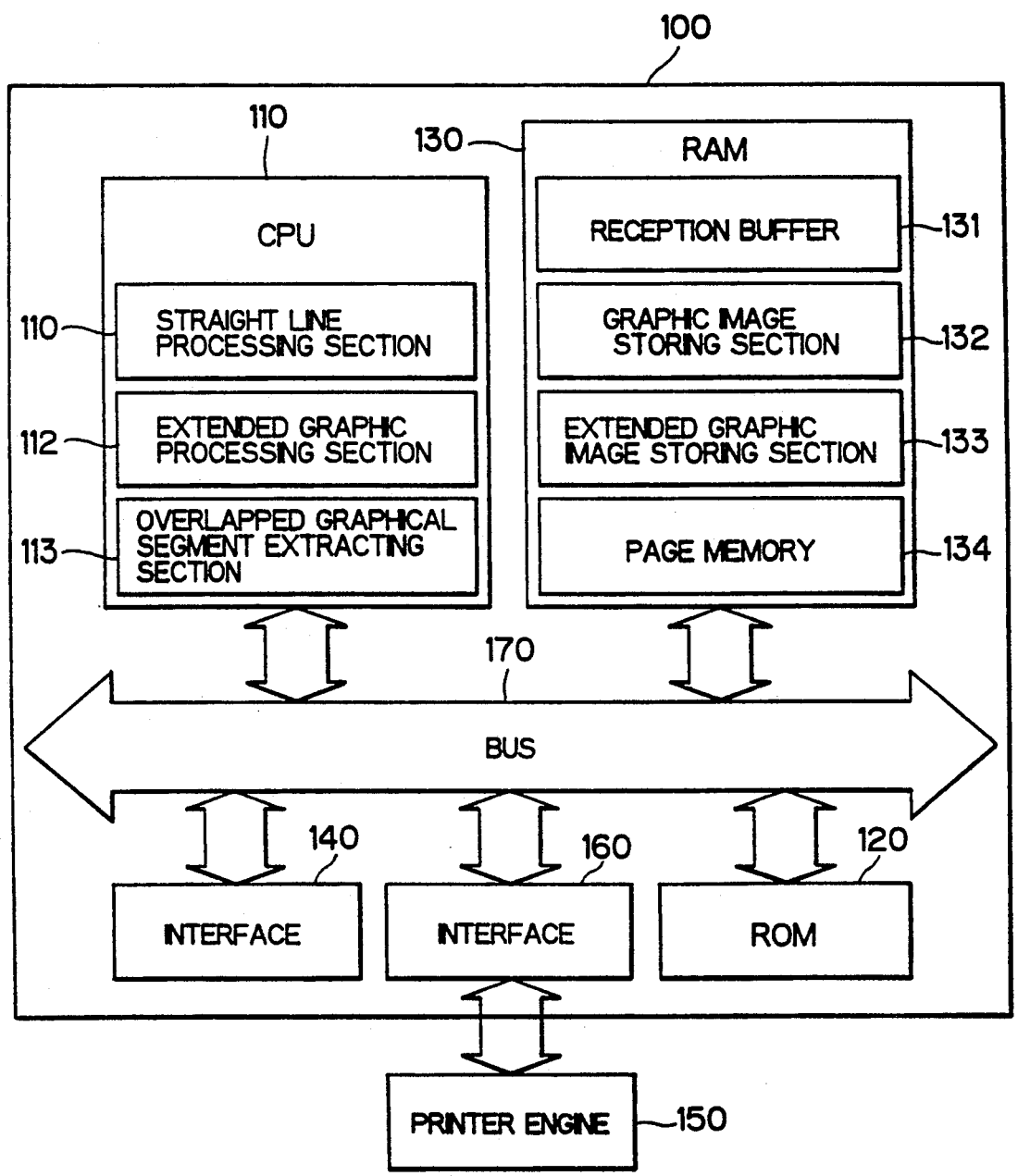
FIG. 4 is a block diagram showing a graphic image drawing device using a laser beam printer according to an embodiment of the present invention.
Figure 5:
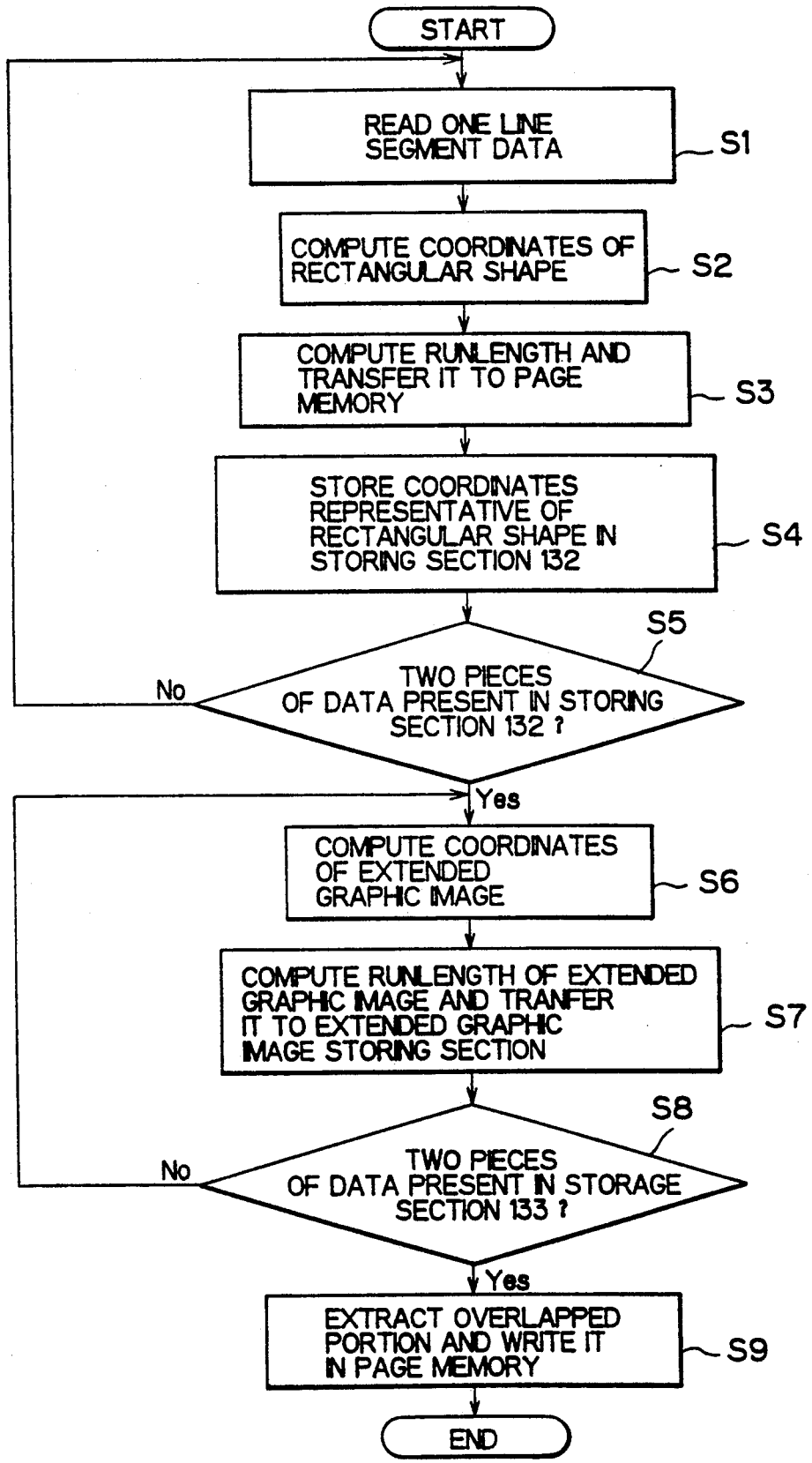
FIG. 5 is a flow chart illustrating an operational sequence executed by a CPU of the graphic image drawing device shown in FIG. 4.

FIG. 4 shows in block form an arrangement of a main control unit 100 of the laser beam printer. The main control unit 100 includes a central processing unit (CPU) 110 for governing the laser beam printer, a program read-only memory (ROM) 120 storing a control program for controlling the graphic image drawing device, a random access memory (RAM) 130, an interface 140 serving as an input/output port for connection of the main control unit 100 to an external device such as a host computer, another interface 160 for a data communication between a printer engine 150 and the main control unit 100, and a bus 170 for mutually connecting those components. The CPU 110 executes various kinds of jobs and thus it can be divided into several parts in terms of the jobs executed. Specifically, the CPU 110 is divided into a straight line processing section 111, an extended graphic processing section 112, and an overlapped graphical segment extracting section 113. The straight light processing section 111 computes graphic data regarding each of two intersecting straight line segments having a width. The extended graphic processing section 112 computes and outputs graphic data regarding a graphic to be formed by extension lines originating from the two line segments. The overlapped graphical segment extracting section 113 extracts an overlapped portion of two extended graphics.

The RAM 130 is divided into various storage areas serving as a reception buffer 131 for storing graphic image drawing commands received from a host computer, a graphic image storing section 132 for storing graphic image representative of intersecting two lines having a computed line width, and an extended graphic image storing section 133 for storing data regarding the two extended graphics, and a page memory 134.

Graphic image process executed by the main control unit 100 will be described in detail with reference to FIGS. 2 through 6.

Print data composed of various kinds of control commands and coordinate values are received from the host computer and are temporarily stored in the reception buffer 131. The print data are sequentially read out from the reception buffer 131 in accordance with a program stored in the program ROM 120. With the print data, two straight line segments are assumed to be drawn which are of the same line width w and have lengths defined by points a and b and points a and c.

Figure 6:
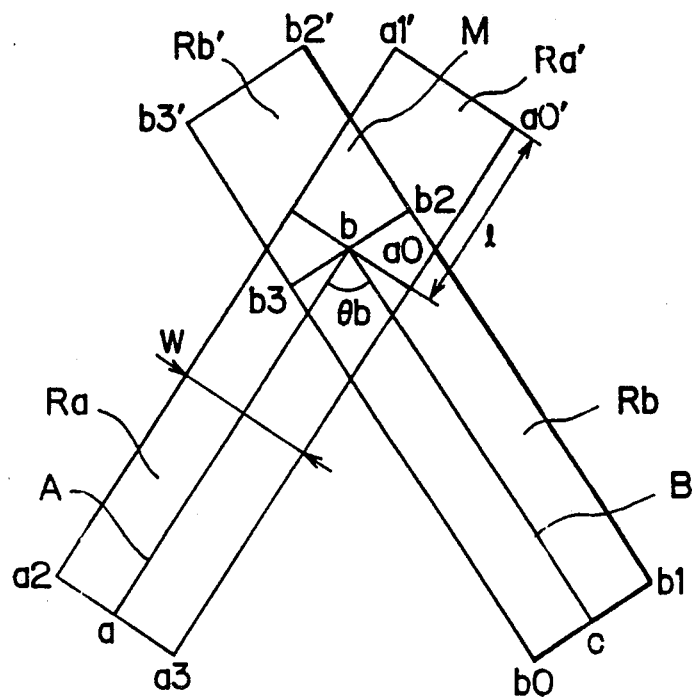
FIG. 6 is an explanatory diagram illustrating a drawing process according to the present invention.

In FIG. 6, the points a, b and c represent coordinate values wherein the points a and b define the length of line segment A and the points c and b define the length of line segment B. In the flow chart in FIG. 5, graphic data representative of the line segment A having a line width w are sent to the straight line processing section 111 (step S1) where the coordinate values of four points a0, a1, a2 and a3 defining the rectangular shape Ra are computed based on the coordinates of the points a and b and the line width w (step S2). Based on the coordinate data of the four points, runlength data are computed for drawing the rectangular shape Ra. The runlength data thus computed are transferred to the page memory 134 for storage therein (step s3). The coordinate values of the four points a0, a1, a2 and a3 are transferred to the graphic image storing section 132 for storage therein (step S4). This completes the processing for drawing one line segment and then the routine returns to step S1 to draw another line segment.

The process for the line segment B is similarly carried out. Graphic data representative of the line segment B having a line width w are sent to the straight line processing section 111 (step S1) where the coordinate values of four points b0, b1, b2 and b3 defining the rectangular shape Rb are computed based on the coordinates of the points b and c and the line width w (step S2). Based on the data of the four points, runlength data are computed for drawing the rectangular shape Rb. The runlength data thus computed are transferred to the page memory 134 for storage therein (step s3). The coordinate values of the four points are transferred to the graphic image storing section 132 for storage therein (step S4). With the above processing, the coordinate values of the two rectangular shapes Ra and Rb are stored in the graphic image storing section 132. The routine then advances from step S5 to step S8.

Based on the coordinates values of the rectangular shapes Ra and Rb, the extended graphic processing section 112 obtains coordinate values a0, a0', a1' and a1 defining the extended graphic image Ra' (step S6), and computes runlength data regarding the extended graphic image Ra' and transfers the computed runlength data to the extended graphic image storage section 133 for storage therein (step S7). The coordinate values of the extended graphic image are obtained by extending the lines a1-a2 and a3-a0 by the length l and computing the coordinate values of the point a0' and a1'. The length l is determined depending on both the angle $\theta b$ formed by the two lines segments and the line width w. For example, l is determined by the following equation:

$$l = \alpha * (w/2) * (1/\tan(\theta b/2))$$

where $\alpha$ is an appropriate value equal to or larger than 1.0.

After the coordinate values representative of the extended graphic image Ra' are computed, runlength data are computed which are necessary to draw the extended graphic image. The runlength data thus computed are transferred to the extended graphic image storing section 133 for storage therein (step S7). To carry out the same processing with respect to the extended graphic image Rb' defined by the coordinate values of b3, b2, b2' and b3', the routine returns to step S6 from step S8 and the processing in steps S6 and S7 are executed. The extended graphic image storage section 133 stores the runlength data regarding both the extended graphic images Ra' and Rb'. In this condition, the routine returns to step S9.

Figure 7:
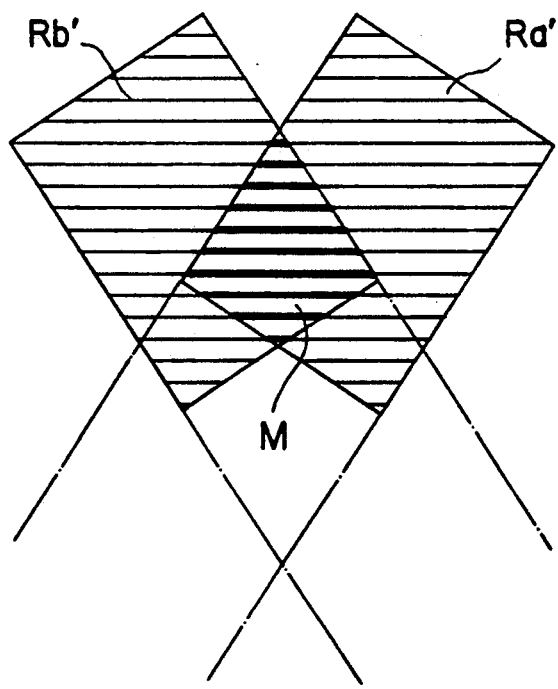
FIG. 7 is an explanatory diagram illustrating how the intersecting portion of two lines is to be processed.

The overlapped graphical segment extracting section 113 compares the runlength data of both the extended graphic images Ra' and Rb' stored in the extended graphic storage section 133 and extracts the runlength of the overlapped portion. The extracted overlapped runlength data are sent to the page memory 134 to develop the overlapped portion M (see FIG. 7) in the page memory 134. The graphic image developed in the page memory 134 are printed in response to a print command issued from the host computer and are then erased.

Figure 8:
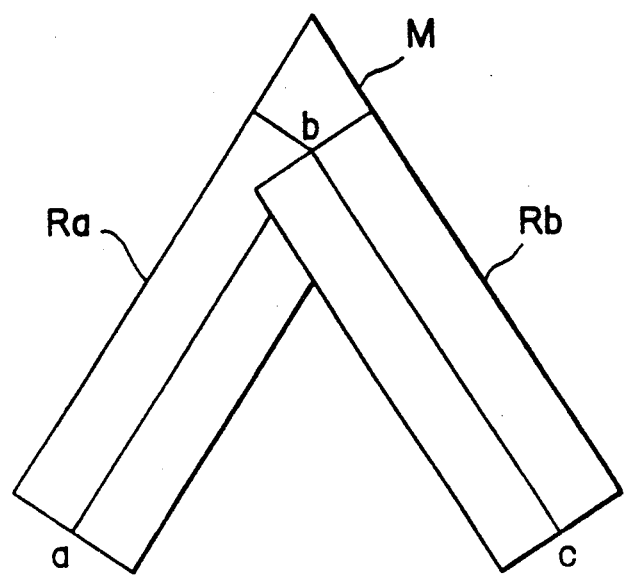
FIG. 8 is an explanatory diagram illustrating the intersecting two lines drawn according to the device of the present invention.
Figure 9:
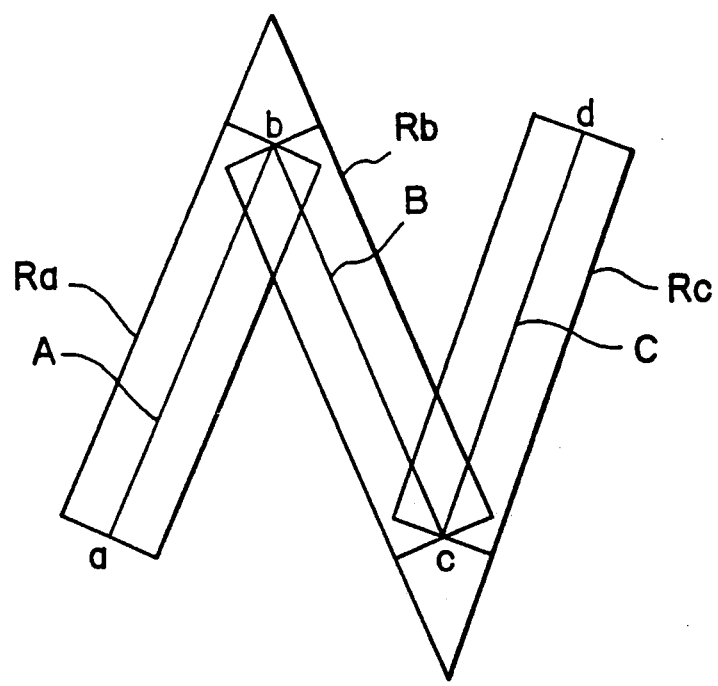
FIG. 9 is an explanatory diagram illustrating a plurality of line segments sequentially connected one after another to form a zig-zag pattern.

Although the processing of the merged portion b of the line segments A and B as shown in FIG. 6 have been described, a graphic image composed of a plurality of line segments sequentially connected one after another as shown in FIG. 9 may be similarly processed. Specifically, after processing of the line segments A and B, the processing for the line segment C is executed in steps S1 through S3 of the flow chart in FIG. 5. In step S4, in lieu of the coordinate data of the rectangular shape Ra, the coordinate data for the rectangular shape Rc defining the line segment C are stored in the graphic image storage section 132. As a result, the coordinate data for the rectangular shapes Rb and Rc are stored in the graphic image storing section 132. Thereafter, the processing in steps S6 through S9 are executed. In this manner, the contents in the graphic image storing section 132 are sequentially updated, so that the merged portion M as shown in FIG. 8 are developed for the graphic image composed of a plurality of line segments connected one after another.

The graphic image drawn according to the present invention is smoothly connected at the intersecting portion of the two line segments and thus a high quality image is obtained.

While only one exemplary embodiment of this invention has been described in detail, those skilled in the art will recognize that there are many possible modifications and variations which may be made in this exemplary embodiment while yet retaining many of the novel features and advantages of the invention. Accordingly, all such modifications and variations are intended to be included within the scope of the appended claims.

What is claimed is:

1. A graphic image drawing device comprising:
   first computing means for obtaining graphic data representative of a line segment defined by a length between two given points and a width;
   first storage means for storing first graphic data representative of a first line segment and second graphic data representative of a second line segment, both the first and second graphic data being obtained by said first computing means, the first line segment having first and second side lines equal in length to a length of the first line segment and the second line segment having first and second side lines equal in length to a length of the second line segment wherein the first and second line segments intersect at respective ends thereof;
   second computing means for obtaining first graphic data representative of a first extended graphic segment formed by extending the first and second side lines of the first line segment in a direction to intersect extended first and second side lines of the second line segment and second graphic data representative of a second extended graphic segment formed by extending the first and second side lines of the second line segment in a direction to intersect the extended first and second side lines of the first line segment based on the first and second graphic data stored in said first storage means;
   second storage means for storing the first and second graphic data obtained by said second computing means;
   extracting means for extracting graphic data representative of an overlapped graphic segment of the first and second extended graphic segments based on the first and second graphic data stored in said second storage means; and
   drawing means for drawing a graphic image based on the first and second graphic data stored in said first storage means and the graphic data extracted by said extracting means.

2. The device according to claim 1, further comprising buffer means for temporarily storing print data transmitted from an external device, and wherein said first computing means reads the print data out of said buffer means and computes the print data to obtain the graphic data representative of the line segment.

3. The device according to claim 2, wherein the print data represent the line segment with coordinates of the two given points and the width, and wherein said first computing means obtains coordinates of four points defining the line segment which is in a form of a rectangular shape.

4. The device according to claim 3, wherein said first computing means computes first and second runlength data corresponding respectively to the first and second line segments and transfers the first and second runlength data into said drawing means.

5. The device according to claim 4, wherein said second computing means obtains coordinates of preselected number of points defining the first and second extended graphic segments and computes first and second runlength data corresponding respectively to the first and second extended graphic segments based on the coordinates thus obtained by said second computing means, the first and second runlength data computed by said second computing means being stored in said second storage means.

6. The device according to claim 5, wherein the first and second extended graphic segments are determined depending on an angle formed by the first and second line segments and the widths of the first and second line segments.

7. The device according to claim 5, wherein said extracting means compares the first runlength data with the second runlength data both computed by said second computing means to extract the graphic data in a form of runlength data which represent the overlapped graphic segment.

8. The device according to claim 7, wherein the runlength data representative of the overlapped graphic segment are transferred into said drawing means.

* * * * *